United States Patent [19]
Keeney et al.

[11] Patent Number: 5,275,347
[45] Date of Patent: Jan. 4, 1994

[54] AUTOTHREAD MECHANISM FOR STRIP MATERIAL

[75] Inventors: Richard A. Keeney, Eagan; Gerald A. Jensen, Plymouth, both of Minn.

[73] Assignee: Management Graphics, Inc., Minneapolis, Minn.

[21] Appl. No.: 818,823

[22] Filed: Jan. 10, 1992

[51] Int. Cl.$^5$ .................................... B65H 18/10
[52] U.S. Cl. ......................... 242/71.1; 242/67.1 R; 226/92
[58] Field of Search ............ 242/78.3, 71.1, 67.1; 226/193, 92

[56] References Cited

U.S. PATENT DOCUMENTS

| | | | |
|---|---|---|---|
| 2,237,737 | 4/1941 | Houston | 242/71.1 |
| 2,951,656 | 9/1960 | Wellman | 242/71.1 |
| 3,077,293 | 2/1963 | Watkins | 226/186 |
| 3,917,185 | 11/1975 | Canada et al. | 242/68.5 |
| 3,989,202 | 11/1976 | Noe et al. | 242/68.1 X |
| 4,274,726 | 6/1981 | Yoneyama et al. | 242/71.1 X |
| 4,358,089 | 11/1982 | Buzzell | 242/68 X |
| 4,741,439 | 5/1988 | Bizic | 242/71.1 |
| 4,779,110 | 10/1988 | Stella | 242/71.1 X |
| 4,846,418 | 7/1989 | Fairman | 242/71.1 |
| 4,854,519 | 8/1989 | Maeda et al. | 242/71.1 |
| 4,934,622 | 6/1990 | Hakiel | 242/68.5 |
| 5,145,066 | 9/1992 | Clark et al. | 242/71.1 X |

Primary Examiner—Daniel P. Stodola
Assistant Examiner—Paul T. Bowen
Attorney, Agent, or Firm—Barry R. Lipsitz

[57] ABSTRACT

A takeup magazine is provided for automatically loading a strip of material such as photographic film onto a removable core. A housing contains a rotatable platter. A friction ring is mounted coaxially above the platter for rotation therewith. A removable core having a diameter smaller than that of the friction ring is mounted coaxially above the platter for rotation with the platter and the friction ring. An opening in the housing receives an end of a strip of material to be wound onto the core. The end of the material is guided to engage the core and the friction ring when the strip is pushed into the opening. The guiding of the strip can be accomplished using a first pivoting arm for guiding the end in the direction of the core and at least one second arm for urging the strip against the core.

19 Claims, 2 Drawing Sheets

AUTOTHREAD MECHANISM FOR STRIP MATERIAL

BACKGROUND OF THE INVENTION

The present invention relates to the handling of strip material, such as photographic film, and more particularly to an automatic rethread mechanism for loading film into a takeup magazine for use in a film recorder or the like.

Various mechanisms utilize strip material that is unwound from a first core, processed, and rewound onto a second core. For example, conventional photographic cameras unwind film from a film cassette onto a spool in a camera. After the film is exposed, it is rewound into the film cassette, which is light tight so that the film can be removed from the camera for processing. Reel-to-reel recorders for film and magnetic tape are also well known.

Various autothread mechanisms are known for use in film cameras. Examples of such mechanisms can be found in U.S. Pat. Nos. 3,463,071; 4,572,635; 4,641,936; 4,752,797; 4,841,319; and 4,956,658. Automatic film threading systems for use with film processing equipment are also well known. Examples of such systems can be found in U.S. Pat. Nos. 3,178,124; 4,248,516; 4,641,939; 4,798,375; 4,831,401; and 4,949,114.

A disadvantage of the automatic film threading arrangements known in the prior art is that a special sprocket wheel or film core is necessary in order to automatically receive and wind the film. Thus, it is necessary to unwind the film off of the special core or sprocket wheel before the apparatus using the film can be reloaded. This operation is inconvenient and time consuming, particularly when the apparatus is used in a commercial environment.

One type of apparatus that uses photographic film and would benefit from an improved automatic film rethread mechanism is known as a film recorder. In a conventional film recorder, a light beam from a cathode ray tube ("CRT") or the like is controlled by a deflection system to scan across a stationary frame of photographic film to expose the film with an image. Typically, the images are generated by a computer for the production of slides, transparencies, photographs, or the like. Alternatively, the images can comprise natural images acquired by a scanner or television camera for subsequent processing by a computer.

Known film recorders, such as those sold under the trademark "Solitaire" by Management Graphics, Inc. of Minneapolis, Minn., U.S.A., typically include a light source such as a CRT for producing a beam, a deflection system for scanning the beam across the face of the CRT, a system control and central processor unit ("CPU") for controlling the deflection system, and a camera (i.e., "film transport"). The latter component may include a film transport body, lens, lens mounting assembly, aperture plate, film plate, and film transport mechanism. On a Solitaire film recorder, an image to be recorded is first written on the phosphor of the CRT by deflecting an electron beam in a raster pattern and modulating the intensity of the beam. This process is analogous to the creation of a television picture. Alternatively, the image can be written on the CRT using well known time modulation techniques, wherein the beam intensity is constant but the time the beam is kept at each point is varied depending on the exposure required.

The resulting pattern (the "object image") on the CRT is optically imaged onto photographic film by the film transport, which contains the required optics and mechanism to advance the film to successive frames. Other types of light sources can be substituted for the CRT in a film recorder. Examples include fiber optic sources, lasers, and focused light impinging a rotating drum wherein one or more rotations are completed for each scan line.

Once each frame of film is exposed, it is wound around a film core for storage until a sequence of frames is ready to be photographically processed. A takeup magazine is generally provided for holding the exposed film in a light tight manner, thereby preventing inadvertent reexposure thereof to light, which would ruin the photographic images contained on the film. In the past, the threading of film onto the film core has been a somewhat cumbersome manual process, wherein the free end of a strip of film from a film supply is inserted into a slot or grip on the film core, and wound around the film core to a point at which rotation of the film core will wind the film around the core without slipping. The manual loading of film in this manner is inconvenient and can reduce productivity.

It would be advantageous to provide an automatic mechanism for threading strip material, such as photographic film, around a takeup spool and/or into a takeup magazine. It would be further advantageous for such apparatus to use a standard film core, without modification and which can be easily removed and replaced with an empty core for use with a subsequent strip of material. Such apparatus should be simple to manufacture and use, and provide highly reliable operation.

The present invention provides a takeup magazine and apparatus for automatically loading strip material around a takeup spool and/or into a magazine having the aforementioned advantages.

SUMMARY OF THE INVENTION

In accordance with the present invention, a takeup magazine is provided for automatically loading a strip of material, such as photographic film, onto a removable core. A housing contains a platter for supporting a spool of strip material. A friction ring is mounted above the platter for rotation about an axis. Means are provided for mounting a removable core, having a diameter smaller than that of the friction ring, above the platter. The core is mounted coaxially with the friction ring for rotation therewith. An opening in the housing receives an end of a strip of material to be wound onto the core. Means are provided for guiding the end of the strip of material to engage the core and friction ring when the strip is pushed into the opening.

In an illustrated embodiment, the platter is coaxial and rotatable with the friction ring and the core, and the friction ring is mounted between the platter and the core. The friction ring can comprise a rubber O-ring, for example silicone rubber.

In the illustrated embodiment, the guiding means comprise a first pivoting arm for guiding the end of the strip in the direction of the core. At least one second arm is provided for urging the strip against the core.

Apparatus for automatically loading a strip of material into a magazine in accordance with the present invention comprises means for driving the strip of material at a first rate along a path into an opening in the magazine. Guide means in the magazine guide the strip from the opening toward a core that rotates at a second rate greater than the first rate. A friction ring, having a diameter that is greater than the diameter of the core, is coaxially mounted adjacent the core for rotation therewith. In this manner, the core and friction ring pull the strip tightly therearound after engagement of an end of the strip therewith. Similar apparatus for automatically threading a strip of material around a takeup spool, which is not necessarily provided in a takeup magazine, is also disclosed.

Means can be provided in the path for cutting the strip of material. Means are also provided in accordance with the invention for stopping the drive means after the cutting means cut the strip. The core is rotated after the drive means have stopped, to finish winding the cut strip into the magazine and/or around the takeup spool.

DETAILED DESCRIPTION OF THE INVENTION

Figure 1:
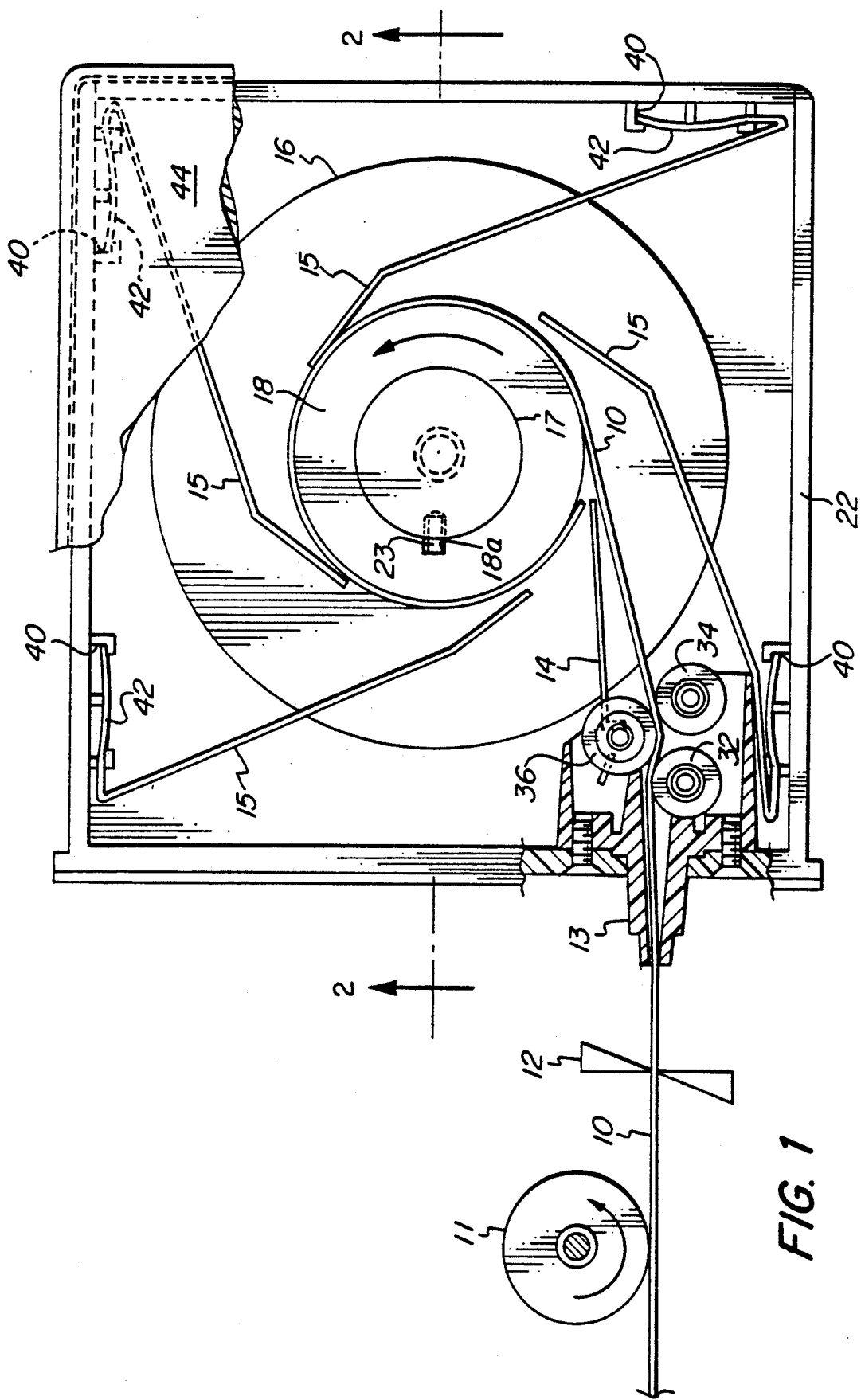
FIG. 1 is a schematic illustration of a film path and takeup magazine in accordance with the present invention.

The present invention provides a takeup magazine and apparatus for automatically rethreading the head of a strip of material, such as 35 millimeter photographic film, onto a standard "U" core. When processing of the strip of material is finished, such as when a desired number of frames of film have been exposed, the standard core can be easily removed and replaced with an empty one. No modifications are necessary to the core, and no operator intervention is required to complete the threading process once the takeup magazine is in place.

The invention is described herein in connection with an automatic film rethread mechanism for use in a film recorder. It should be appreciated, however, that the takeup magazine and apparatus of the present invention is not limited to use in a film recorder, or even with photographic film. Many different processes that use strip material will benefit from the present invention, as broadly disclosed and claimed herein.

Referring now to the figures, a strip of 35 millimeter film 10 is illustrated which is inserted into an inlet 13 provided in a takeup magazine 22. A film drive, such as a conventional driven sprocket 11 is provided to push the film 10 through a cutting unit 12 and into magazine inlet 13. Cutting mechanism 12 is provided to cut the film into strips during different imaging sessions. In the event that a single imaging session exposes enough film to completely fill takeup magazine 22, cutting mechanism 12 is used to cut the film before the capacity of the takeup magazine is exceeded.

Inlet 13 provides a path for the film to enter the takeup magazine. The inlet is also responsible for maintaining light tightness when the magazine is removed from the camera or other equipment. A pivoting arm 14 is provided on a roller 36 to guide the film from the inlet to the correct side of a takeup core 18. A plurality of flexible arms 15 are provided to guide the film around the takeup core. Arms 15 flex to allow the diameter of the wound film to grow up to the capacity of the magazine. For example, a takeup magazine that holds 100 feet of film can be provided. Arms 15 are mounted to the takeup magazine by sliding ends 42 thereof into corresponding channels 40 provided on the interior of the magazine. The flexible arms 15, as well as pivoting arm 14, are constructed from a material such as beryllium copper that is resilient and can be polished smooth enough so that it will not scratch the film. In another embodiment, not illustrated, the ends of flexible arms 15 and pivoting arm 14 can be provided with rollers to prevent damage to the film 10.

A circular platter 16 is provided within takeup magazine 22. The platter serves as a base for the film as it wraps around the takeup spool 18. In a preferred embodiment, circular platter 16 rotates together with the takeup core.

Figure 2:
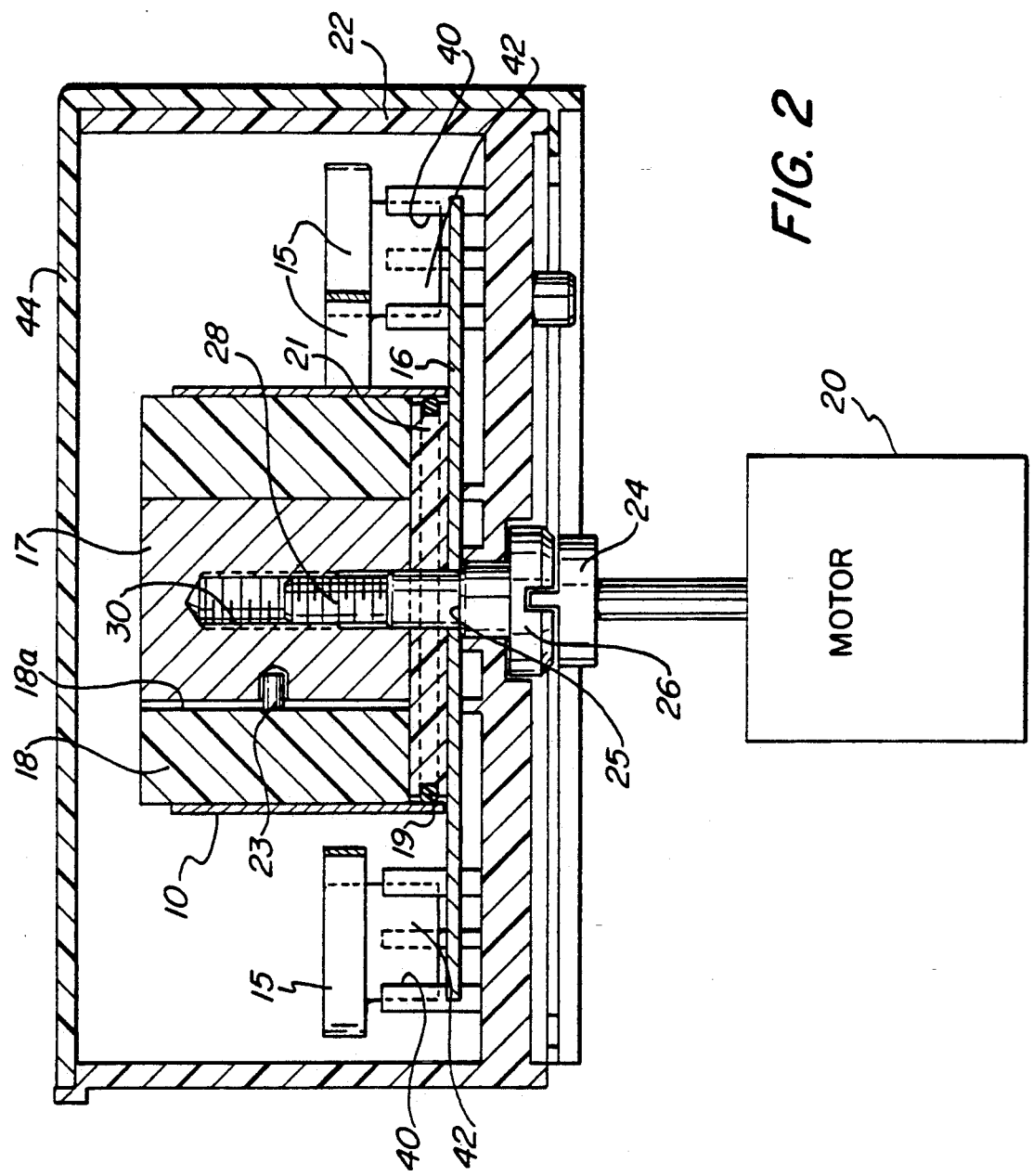
FIG. 2 is a cross-sectional view of the takeup magazine and a takeup motor therefor.

A spindle 17 holds and drives the takeup core 18. The removable takeup core is advantageously a standard two inch diameter "U" core available from the Eastman Kodak Company, Rochester, N.Y. The spindle 17 includes a threaded shaft 30 that receives a corresponding threaded spindle post 28 (FIG. 2) for driving the spindle 17. A roll pin 23 protruding from spindle 17 engages a corresponding keyway 18a in core 18 to drive the core.

In accordance with the present invention, a rubber friction ring 19 is positioned on a rim 21 between the bottom of the core 18 and the rotating platter 16. Rim 21 is tightly sandwiched between spindle 17 and platter 16 by the clamping action of threaded spindle post 28 and shoulder 25 of drive pin 26. In the illustrated embodiment, the friction ring comprises a silicone rubber O-ring. The friction ring rotates with the platter 16 and core 18, and is the key to providing enough friction to pull the film around and tightly onto the takeup core. Without the friction ring, a standard takeup core is too slick to ever get a good grip on the film. In the embodiment illustrated, the edge of the film hangs slightly below (e.g., about # inch) the bottom of the core to contact the friction ring.

A takeup motor 20 drives the platter 16, friction ring 19, and spindle 17 via a drive head 24 that mates with a slot in the head of drive pin 26. Takeup motor 20, under a no load condition, must spin faster than the rate at which film 10 is pushed into inlet 13 by drive sprocket 11. Takeup motor 20 must also provide a correct amount of torque to maintain the film tightly around the takeup core when successive images are being exposed, e.g., in the area between sprocket 11 and cutting mechanism 12. The no load speed of the motor and stalled torque are easily controlled by the gearing ratio of a gear train and a series resistor to limit stall current to the motor, as well known in the art.

In order to rethread the apparatus in accordance with the present invention, an empty core 18 is installed onto spindle 17 in the magazine 22, and the magazine is installed such that the head of drive pin 26 mates with drive head 24 of takeup motor 20. A cover 44 is placed over the top opening of magazine 22 in a conventional manner to maintain a light tight environment within the magazine. The cut end of the film 10 will be present at the cutting unit 12, having been left there from the previous unload operation. In the event that a new spool of film is being loaded, it will be threaded past sprocket 11 and inserted into the mouth of cutting unit 12.

During each frame advance provided by the film recorder, the film platter 16, spindle 17, core 18, and friction ring 19 are driven by the takeup drive motor 20. As frames are advanced, one at a time after each exposure, the film is pushed into and through the inlet 13 of the takeup magazine. Pivoting arm 14 will guide the film to the point where it contacts the film core 18 and the friction ring 19. The core 18 and friction ring 19 may slip past the film as they spin at this point. This is acceptable, since the main drive mechanism 11 can still push the film a significant distance around the core.

As the film continues to advance within takeup magazine 22, it is guided around the film core 18 by the flexible arms 15. The natural curl of the film (emulsion-in) significantly helps this process. At the point where the film is about half-way around the core 18, friction ring 19 will provide enough friction to stop the core and ring from slipping. The core and ring will then assist in pulling the film around the core. Once a complete revolution of film is wrapped around the core 18, the second layer of film provides pressure on the first layer of film against the friction ring and the core. This further ensures that the film will no longer slip and will be properly wound around the core. As the diameter of the wound-up film increases, the flexible arms 15 and pivoting arm 14 are pushed out of the way.

When a strip of film is complete, either by completing a sequence of exposures or filling the takeup magazine to its capacity, the film is cut by the cutting unit 12. The cut-off end of the film is pulled into the takeup magazine by running the takeup motor 20 for a few seconds. The main drive motor 11 is not run while the film is pulled into the takeup magazine. The magazine is then removed from the film recorder and taken to a dark room for unloading.

Unloading of the magazine is simple. The cover is opened, and the roll of film is removed along with the core 18. The cores are inexpensive and easy to obtain, since each new roll of film comes on one. Thus, each time a roll of film is used up, the user will have an empty core that can be used in the takeup magazine. An empty core is installed in the magazine before closing the magazine with its cover, and returning it to the film recorder to start another strip.

It will now be appreciated that the present invention provides a simple, reliable, and relatively inexpensive mechanism for use in automatically rethreading a takeup magazine. A standard core is used within the takeup magazine. The provision of a rubber friction ring, that has a diameter slightly greater than that of the core, enables the film to be wrapped around the core as it is advanced into the takeup magazine. There is no need to unwind the film back off of the core in order to reuse the magazine, since extra cores are easily obtained from spent rolls of film for use in the takeup magazine.

Although the invention has been described in connection with a specific embodiment thereof, those skilled in the art will appreciate that numerous adaptations and modifications may be made thereto without departing from the spirit and scope of the invention as set forth in the claims.

What is claimed is:

1. A takeup magazine for automatically loading a strip of material onto a removable core, comprising:
   a housing containing a rotatable platter;
   a friction ring mounted coaxially above said platter for rotation about an axis;
   means for holding a removable core having a diameter smaller than that of said friction ring above said platter and coaxial with said friction ring for rotation therewith;
   an opening in said housing for receiving an end of a strip of materials to be wound onto said core; and
   means for guiding said end to engage said core and friction ring when the strip is pushed into said opening;
   wherein said holding means releasably holds said core adjacent to said friction ring to enable removal of the core from the takeup magazine with a supply of said material wound thereon, while said holding means, friction ring and platter remain in said takeup magazine.

2. A takeup magazine in accordance with claim 1 wherein said friction ring is mounted between said platter and said core.

3. A takeup magazine in accordance with claim 1 wherein said friction ring comprises silicone rubber.

4. A takeup magazine in accordance with claim 1 wherein said friction ring is a rubber O-ring.

5. A takeup magazine in accordance with claim 1 wherein said guiding means comprise:
   a first pivoting arm for guiding said end in the direction of said core; and
   at least one second arm for urging said strip against said core.

6. A takeup magazine in accordance with claim 1 wherein said platter is coaxial and rotatable with said friction ring and said core.

7. A takeup magazine in accordance with claim 1 wherein said core is a standard U core for photographic film.

8. A takeup magazine in accordance with claim 1 wherein said guide means allow an edge of said strip to extend beyond a corresponding edge of said core for engagement with said friction ring.

9. Apparatus for automatically loading a strip of material onto a replaceable core in a magazine comprising:
   means for driving a strip of material at a first rate along a path into an opening in said magazine;
   guide means in said magazine for guiding said strip from said opening toward a replaceable core that rotates at a second rate greater than said first rate; and
   a friction ring, independent of said core and having a diameter that is greater than the diameter of said core, coaxially mounted adjacent said core for rotation therewith;
   wherein said core and friction ring pull said strip tightly therearound after engagement of an end of said strip therewith, said core with said strip wound thereon being removable from said friction ring in said magazine as an integrated unit.

10. Apparatus in accordance with claim 9 wherein said friction ring comprises silicone rubber.

11. Apparatus in accordance with claim 9 wherein said friction ring is a rubber O-ring.

12. Apparatus in accordance with claim 9 further comprising means in said path for cutting said strip.

13. Apparatus in accordance with claim 12 further comprising:
   means for stopping said drive means after said cutting means cut said strip; and
   means for rotating said core after said drive means have stopped to finish winding the cut strip into said magazine.

14. Apparatus in accordance with claim 9 wherein said core is a standard U core for photographic film.

15. Apparatus in accordance with claim 9 wherein said guide means allow an edge of said strip to extend beyond a corresponding edge of said core for engagement with said friction ring.

16. Apparatus for automatically threading a strip of material around a takeup spool comprising:
- means for driving a strip of material at a first rate toward a takeup spool that rotates at a second rate greater than said first rate;
- guide means adjacent said spool for guiding a leading edge of said strip toward said spool with a side edge of said trip extending beyond a corresponding edge of said spool; and
- a friction ring, independent of said spool and having a diameter that is greater than the diameter of said spool, coaxially mounted adjacent said spool for rotation therewith without being affixed to said spool;
- wherein said spool and friction ring pull said strip tightly therearound after engagement of said leading edge therewith.

17. Apparatus in accordance with claim 16 wherein said friction ring comprises silicone rubber.

18. Apparatus in accordance with claim 16 wherein said friction ring is a rubber O-ring.

19. Apparatus in accordance with claim 16 wherein said spool is a standard U core for photographic film.

* * * * *